United States Patent
Hu et al.

(10) Patent No.: US 9,899,848 B2
(45) Date of Patent: Feb. 20, 2018

(54) MOBILE TERMINAL, DC-CHARGING POWER SOURCE ADAPTOR, AND CHARGING METHOD

(71) Applicant: HISENSE MOBILE COMMUNICATIONS TECHNOLOGY CO., LTD., Qingdao (CN)

(72) Inventors: Ermeng Hu, Qingdao (CN); Rongyi Yin, Qingdao (CN); Xintao Zhang, Qingdao (CN); Wenjuan Du, Qingdao (CN)

(73) Assignees: HISENSE MOBILE COMMUNICATIONS TECHNOLOGY CO., LTD, Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 132 days.

(21) Appl. No.: 15/064,010

(22) Filed: Mar. 8, 2016

(65) Prior Publication Data

US 2017/0040810 A1    Feb. 9, 2017

(30) Foreign Application Priority Data

Aug. 5, 2015 (CN) .......................... 2015 1 0473330

(51) Int. Cl.
*H02J 7/00* (2006.01)
*H02J 50/10* (2016.01)
(Continued)

(52) U.S. Cl.
CPC .......... *H02J 7/0036* (2013.01); *H02J 7/0052* (2013.01); *H02J 7/0044* (2013.01); *H02J 7/025* (2013.01);
(Continued)

(58) Field of Classification Search
CPC .. H02J 7/025; H02J 50/10; H02J 50/12; H02J 21/00; H02J 38/14; H02J 7/0044
See application file for complete search history.

(56) References Cited

U.S. PATENT DOCUMENTS

| 2006/0149855 | A1 | 7/2006 | Fukuda |
| 2012/0246350 | A1* | 9/2012 | Lee ....................... H02J 7/0008 710/16 |

(Continued)

FOREIGN PATENT DOCUMENTS

| CN | 103066340 A | 4/2013 |
| CN | 103236568 A | 8/2013 |
| CN | 104796011 A | 7/2015 |

OTHER PUBLICATIONS

Office Action from corresponding Chinese Application No. 201510473330.7, dated Jul. 25, 2017 (3 pages).

*Primary Examiner* — Stacy Whitmore
(74) *Attorney, Agent, or Firm* — Harness, Dickey & Pierce, P.L.C.

(57) ABSTRACT

The disclosure discloses a mobile terminal, a DC-charging power source adaptor, and a charging method, the mobile terminal comprising: a battery configured to store electrical energy; a USB interface configured to be engaged with an external device; and a microprocessor configured to determine whether two differential data pins of the USB interface are shorted, upon detecting an external device being inserted into the USB interface; and if so, to communicate with the inserted external device, wherein if the external device is a DC-charging power source adaptor, then the DC-charging power source adaptor switches two communication pins of a charging interface thereof from being shorted by default to being disconnected, and communicates with the microprocessor; and the microprocessor detects voltage of the battery after communicating successfully with the DC-charging (Continued)

power source adaptor, and if the voltage of a battery core lies in a range delimited by preset DC-charging thresholds, then the microprocessor controls the battery to be DC-charged using charging voltage output by the DC-charging power source adaptor, and determines a value of the charging voltage of the DC-charging power source adaptor from the current voltage of the battery core.

20 Claims, 8 Drawing Sheets

(51) Int. Cl.
      *H02J 7/02*         (2016.01)
      *H02J 50/12*      (2016.01)

(52) U.S. Cl.
      CPC ............... *H02J 50/10* (2016.02); *H02J 50/12* (2016.02); *H02J 2007/0059* (2013.01); *H02J 2007/0096* (2013.01)

(56) References Cited

U.S. PATENT DOCUMENTS

| | | | | |
|---|---|---|---|---|
| 2015/0123595 A1* | 5/2015 | Hussain | ................ | H02J 7/0052 320/107 |
| 2015/0180254 A1* | 6/2015 | Zhao | .................... | H02J 7/0052 320/107 |
| 2015/0236522 A1* | 8/2015 | Zhao | ...................... | H02J 7/007 320/162 |
| 2016/0164324 A1* | 6/2016 | Hsu | ...................... | H02J 7/0057 320/114 |

\* cited by examiner

MOBILE TERMINAL, DC-CHARGING POWER SOURCE ADAPTOR, AND CHARGING METHOD

CROSS-REFERENCE TO RELATED APPLICATION

This application claims the benefit and priority of Chinese Patent Application No. 201510473330.7 filed Aug. 5, 2015. The entire disclosure of the above application is incorporated herein by reference.

FIELD

The present disclosure relates to the field of Direct-Current (DC) charging and particularly to a mobile terminal, DC-charging power source adaptor supporting the charging method, and method for charging a battery in a mobile terminal.

BACKGROUND

This section provides background information related to the present disclosure which is not necessarily prior art.

At present, portable mobile terminals have been widely applied in numerous aspects of people's life, and have become a leading factor in the development of the semiconductor industry. The majority of the existing portable mobile terminals are provided with chargeable batteries to power system circuits in the mobile terminals. As an increasing number of functions supported by the portal mobile terminals are emerging, their system circuits also consume more and more power, and given a limited capacity of the batteries, the mobile terminals operate for a shorter and shorter period of time after the batteries are charged, so that the batteries have to be charged more and more frequently.

At present the batteries have been widely charged in two general schemes: in one of the schemes, the batteries are charged by a general power source adaptor (charger), i.e., in the normal DCP charging scheme, where the general power source adaptor generally supports an output of only fixed voltage, e.g., 5V, 9V, 12V, etc., so that the output voltage may not be selectable flexibly; and in the other scheme, the batteries are charged by a host (e.g., a computer, etc.), i.e., in the SDP charging scheme.

SUMMARY

This section provides a general summary of the disclosure, and is not a comprehensive disclosure of its full scope or all of its features An embodiment of the disclosure provides a method for charging a mobile terminal, the method including: determining, by the mobile terminal, whether two differential data pins of a USB interface thereof are shorted, upon detecting an external device being inserted into the USB interface; if so, then communicating with the inserted external device; if the external device is a DC-charging power source adaptor, then switching, by the DC-charging power source adaptor, two communication pins of a charging interface thereof from being shorted by default to being disconnected, and communicating with the mobile terminal; and detecting, by the mobile terminal, voltage of the battery after communicating successfully with the DC-charging power source adaptor, and if the voltage of a battery core lies in a range delimited by preset DC-charging thresholds, then charging the battery directly using charging voltage output by the DC-charging power source adaptor, and determining a value of the charging voltage of the DC-charging power source adaptor from the current voltage of the battery core.

Further to the method above for charging a mobile terminal, an embodiment of the disclosure further provides a mobile terminal including: a battery configured to store electrical energy; a USB interface configured to be engaged with an external device; and a microprocessor configured to determine whether two differential data pins of the USB interface are shorted, upon detecting an external device being inserted into the USB interface; and if so, to communicate with the inserted external device, wherein if the external device is a DC-charging power source adaptor, then the DC-charging power source adaptor switches two communication pins of a charging interface thereof from being shorted by default to being disconnected, and communicates with the microprocessor; and the microprocessor detects voltage of the battery after communicating successfully with the DC-charging power source adaptor, and if the voltage of a battery core lies in a range delimited by preset DC-charging thresholds, then the microprocessor controls the battery to be DC-charged using charging voltage output by the DC-charging power source adaptor, and determines a value of the charging voltage of the DC-charging power source adaptor from the current voltage of the battery core.

In another aspect, an embodiment of the disclosure further provides a method for charging by a DC-charging power source adaptor, the method including: configuring two communication pins in a charging interface of the DC-charging power source adaptor to be shorted by default; controlling the two communication pins of the charging interface to be disconnected, after the charging interface is connected with the mobile terminal; and communicating with the mobile terminal through the communication pins, and after the communication succeeds, determining a value of charging voltage output by the DC-charging power source adaptor from current voltage of a battery core of the mobile terminal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In the disclosure, a strategy to identify the type of charging is designed in a mobile terminal dependent upon configured communication pins of a different external device so that the mobile terminal identifies automatically the type of the externally connected charging device. Also a specialized rapid charging mode is designed for a DC-charging power adaptor, so that a battery being charged routinely is DC-charged at large current to thereby significantly speed up charging of the battery so as to shorten the period of time required for charging the mobile terminal, to alleviate such an influence upon the user in a daily access to the mobile terminal that arises from the mobile terminal being frequently charged for a long period of time, and to greatly improve the satisfactory of the user with the mobile terminal.

In the disclosure, a mobile terminal in which a chargeable battery is built can identify automatically and accurately the type of a currently inserted external device to thereby invoke different charging management modes for different charging characteristics of different types of external devices so as to make reasonable use of charging resources, and the disclosure proposes a charging method for three types of external devices including a host, a normal power source adaptor, and a DC-charging power source adaptor. In this method, firstly a communication mode of the DC-charging power source adaptor is configured so that the DC-charging power source adaptor can exchange data with a mobile terminal to be charged, preferably in the UART (Universal Asynchronous Receiver/Transmitter) communication mode; and then a charging managing circuit in the mobile terminal is adapted to configured interface pins of the host and the normal power source adaptor currently charging through a USB data line so that the mobile terminal can identify automatically the three types of external devices including the host, the normal power source adaptor, and the DC-charging power source adaptor.

Firstly hardware configurations of the mobile terminal and the DC-charging power source adaptor will be described below.

Figure 1:
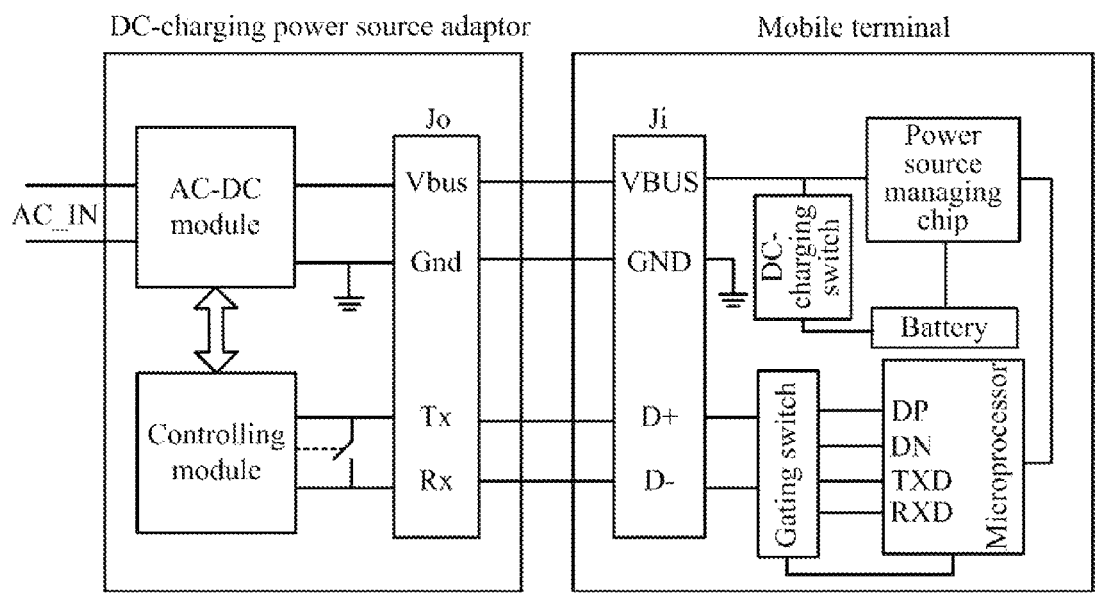
FIG. 1 is a circuit scheme block diagram of an embodiment of a mobile terminal and a DC-charging power source adaptor according to the disclosure.

As illustrated in FIG. 1, in order to maintain the existing traditional charging function of the mobile terminal so that the mobile terminal can be normally engaged with and charged by the existing host and normal power source adaptor, the existing USB interface Ji of the mobile terminal is maintained in this embodiment, i.e., a reused interface for both charging and transmitting data, e.g., the currently widely applied USB interface, so that the mobile terminal can be engaged with and powered by the normal power source adaptor and computer host in the market, which are currently manufactured by the majority of the manufactures. For the power pin VBUS in the USB interface Ji, in this embodiment, one end thereof is connected with a power source managing chip in the mobile terminal, and another end thereof is connected with the battery through a DC-charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the two differential data pins D+ and D− in the USB interface Ji, they are designed to be connected with the microprocessor through a gating switch, which can be a double-pole double-throw switch, to receive a control signal output by the microprocessor, and if the externally connected charging device is the host or the normal power source adaptor, the differential data pins D+ and D− of the USB interface Ji are connected with the respective differential data interfaces DP and DN of the microprocessor through the gating switch; and if it is detected that the differential data pins D+ and D− of the USB interface Ji are shorted, then the gating switch is controlled by the microprocessor to switch the differential data pins D+ and D− of the USB interface Ji to be connected with the respective UART interfaces TXD and RXD of the microprocessor to thereby identify whether the externally connected charging device is the normal power source adaptor or the DC-charging power source adaptor. The microprocessor in the mobile terminal can be designed to conduct UART communication with the externally connected power source adaptor after the differential data pins D+ and D− of the USB interface Ji are switched to be connected with the UART interfaces TXD and RXD of the microprocessor, and if the communication succeeds, to determine that the inserted external device is the DC-charging power source adaptor; otherwise, to determine that the inserted external device is the normal power source adaptor.

In this embodiment, the DC-charging power source adaptor is configured in the UART communication mode instead of the I2C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power source adaptor to thereby improve the safety of the mobile terminal being charged.

Of course, if the instability above is not taken into account, then communication between the mobile terminal and the DC-charging power source adaptor can be designed in another communication mode than UART (e.g., the I2C bus communication mode, etc.) although this embodiment will not be limited thereto.

Figure 2:
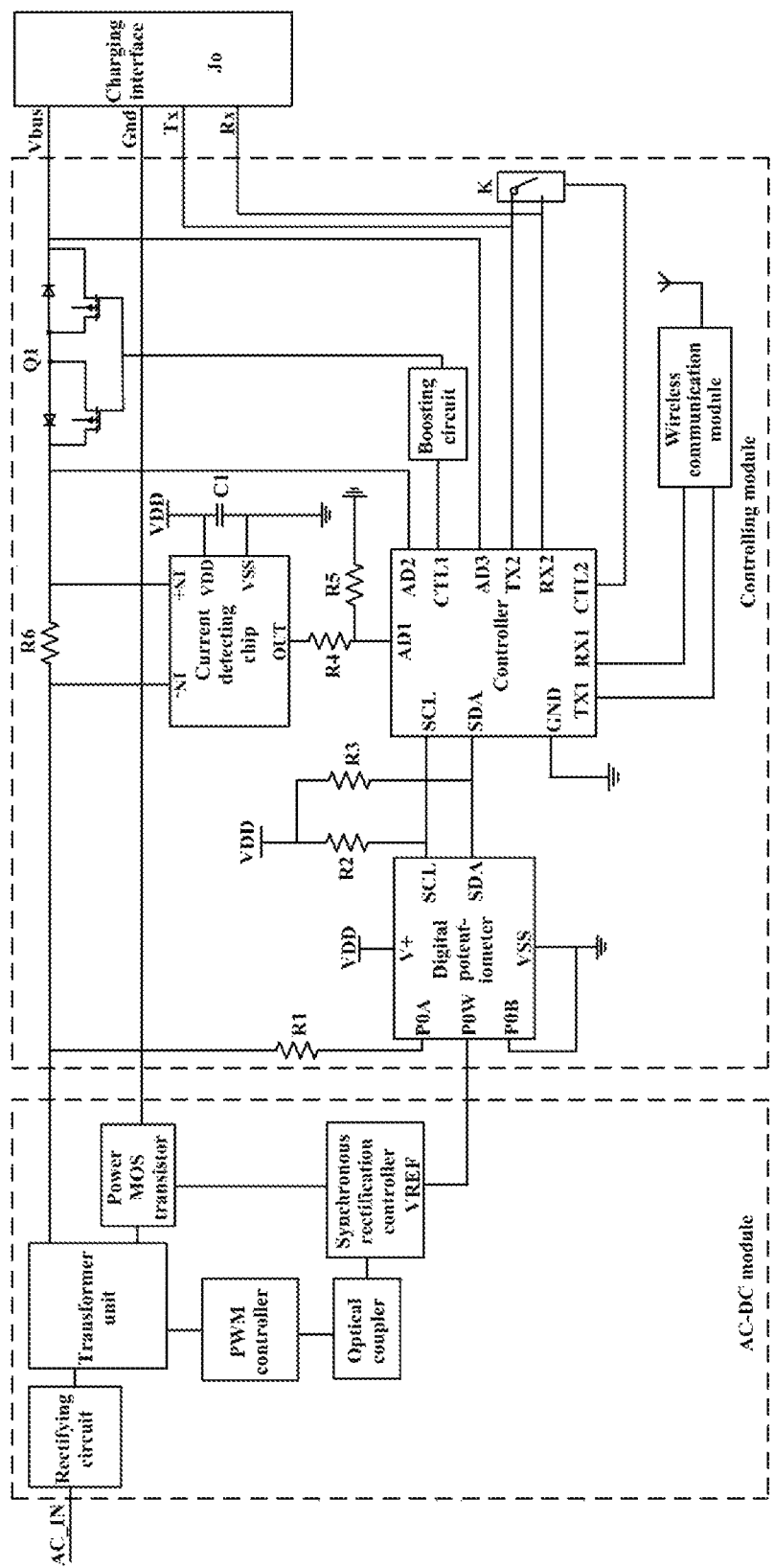
FIG. 2 is a circuit scheme diagram of an embodiment of the DC-charging power source adaptor in FIG. 1.

FIG. 2 illustrates a schematic diagram of circuit components of a DC-charging power source adaptor supporting UART communication, where the DC-charging power source adaptor generally includes three components, i.e., a charging interface Jo, a controlling module, and an AC-DC (converting) module, as illustrated in FIG. 1 as well, where a power source pin Vbus, a ground pin Gnd, and two communication pins Tx and Rx are arranged in the charging interface Jo. The power source pin Vbus configured to transmit a charging power source is connected with the AC-DC module to transmit a DC power source output by the AC-DC module to the power source pin VBUS of the USB interface Ji of the mobile terminal to charge the mobile terminal. The ground pin Gnd is connected with the system ground of the DC-charging power source adaptor, and after the DC-charging power source adaptor is engaged with the mobile terminal, the ground pin Gnd is connected with the ground pin GND of the USB interface Ji of the mobile terminal so that both of the ground pins are grounded together. The two communication pins Tx and Rx of the charging interface Jo are shorted by default, and connected with the respective UART interfaces TX and RX of the controlling module.

If the controlling module detects that the DC-charging power source adaptor is engaged with the mobile terminal, followed by a preset delay period of time (the preset period of time can be determined as a function of a period of time from when the mobile terminal detects an external device being inserted to when the mobile terminal detects that the differential data pins D+ and D− thereof are shorted), then the controlling module will control the two communication pins Tx and Rx of the charging interface Jo to be switched from being shorted by default to be disconnected from each other, and then send a communication command on its own initiative to the mobile terminal through the UART interfaces TX and RX thereof, conduct UART communication with the mobile terminal to exchange a handshake instruction with each other, receive control information sent by the mobile terminal if the handshake succeeds, and further adjust the volt value of the charging voltage output by the AC-DC module according to the control information so that the mobile terminal can be charged differently as required in different phases. Of course, the mobile terminal can alternatively be configured to be timed to send a UART communication command to the externally connected power source adaptor, and to wait for a response command fed back by the DC-charging power source adaptor, in a preset wait period of time after the differential data pins D+ and D− of the USB interface Ji are switched to be connected with the UART interfaces TXD and RXD of the microprocessor of the mobile terminal, and if a valid response command is received in the wait period of time, to determine that the inserted device is the DC-charging power source adaptor; otherwise, to determine that the inserted device is the normal power source adaptor. In this embodiment, the wait period of time shall be longer than the preset period of time so that the DC-charging power source adaptor can receive and respond to the UART communication command sent by the mobile terminal, after the communication pins Tx and Rx of the DC-charging power source adaptor are disconnected from each other.

Of course the controlling module can alternatively be designed to further control the two communication pins Tx and Rx of the charging interface Jo to be switched to be connected with and disconnected from each other, upon reception of a specific pulse waveform sent by the mobile terminal. The controlling module can be configured to firstly configure by default the UART interfaces TX and RX thereof to receive an input, and if the mobile terminal detects that the externally inserted device is a power source adaptor, and the microprocessor of the mobile terminal switches the UART interfaces TXD and RXD thereof to be connected with the differential data pins D+ and D− of the USB interface Ji, then firstly the specific pulse waveform will be output by the microprocessor to the externally connected power source adaptor. If the externally connected power source adaptor is the normal power source adaptor, then no response will be made to the specific pulse waveform. If the externally connected power source adaptor is the DC-charging power source adaptor, then the controlling module in the DC-charging power source adaptor will receive the specific pulse waveform even if the communication pins Tx and Rx are shorted because the UART interfaces TX and RX of the controlling module are configured to receive an input. The controlling module switches the communication pins Tx and Rx of the charging interface Jo from being shorted by default to be disconnected from each other, and resume the communication interface function of the UART interfaces TX and RX of the controlling module, upon reception of the specific pulse waveform. In order to enable DC-charging power source adaptors of different models to receive reliably the specific pulse waveform, the microprocessor in the mobile terminal can be configured to send constantly the specific pulse waveform for a preset period of time which can be determined as a function of a period of time from when the DC-charging power source adaptor receives the specific pulse waveform to when the DC-charging power source adaptor controls the communication pins Tx and Rx thereof to be connected with or disconnected from each other. Thereafter the microprocessor initiates a communication command on its own initiative to the externally connected power source adaptor in the UART communication mode, and if a valid command fed back by the external power source adaptor is received, then the microprocessor determines that the external device is the DC-charging power source adaptor, and starts the rapid charging mode; and if there is no valid command fed back, then the microprocessor determines that the external device is the normal power source adaptor, and at this time the microprocessor disconnects the UART interfaces TXD and RXD thereof from the differential data pins D+ and D− of the USB interface Ji, and starts the normal DCP charging mode.

In order to adjust dynamically the charging voltage output by the AC-DC module, in this embodiment, a rectifying circuit, a transformer module, a synchronous rectification controller, a PWM controller, an optical coupler, a power MOS transistor, and other elements are designed in the AC-DC module; and a controller, a digital potentiometer, a current detecting chip, a boosting circuit, and other elements are designed in the controlling module, as illustrated in FIG. 2, where the rectifying circuit receives an AC input power source AC_IN provided by a mains grid, rectifies the AC input power source into a DC power source, and outputs the DC power source to the transformer module for transformation into the charging voltage to charge the mobile terminal. The UART interfaces TX2 and RX2 of the controller are connected with the communication pins Tx and Rx of the charging interface Jo through two signal lines across which a switch K is connected, where the switch is closed by default to short the communication pins Tx and Rx. If the controller receives the specific pulse waveform, or if the controller detects that the DC-charging power source adaptor is engaged with the mobile terminal, followed by a preset delay period of time (dependent upon the configuration of the controller), then the controller will output a control signal to the switch K through an interface of the controller CTL2 (e.g., a branch of GPIO interface) to control the switch K to be opened, and further create a UART communication line between the DC-charging power source adaptor and the mobile terminal.

In this embodiment, the magnitude of the charging current output through the power source pin Vbus of the charging interface Jo can be detected to thereby determine whether the DC-charging power source adaptor is connected with the mobile terminal. If the DC-charging power source adaptor is not connected with the mobile terminal, then the charging current output through the power source pin Vbus will be substantially zero. If the DC-charging power source adaptor is connected with the mobile terminal, then there may be some charging current even if the battery of the mobile terminal is fully charged. Thus the DC-charging power source adaptor can determine from the magnitude of the charging current whether it is connected with the external mobile terminal.

In order to adjust dynamically the output voltage of the AC-DC module, in this embodiment, the digital potentiometer is designed in the controlling module to be connected with the controller. The controller generates a voltage adjusting instruction from the received control information, and sends the voltage adjusting instruction to the digital potentiometer to change the resistance value of a valid resistor of the digital potentiometer. In this embodiment, the controller can be connected and communicates with the digital potentiometer over an I2C bus, as illustrated in FIG. 2, to transmit the voltage adjusting instruction. In order to ensure the stability of the signal being transmitted, in this embodiment, a voltage pull-up circuit is further connected over the I2C bus, for example, a clock line SCL and a data line SDA of the I2C bus are connected with a DC power source VDD respectively through pull-up resistors R2 and R3 to thereby improve the anti-interference capability of the signal being transmitted.

The DC power source VDD can be embodied as a set of small electromagnetic coils designed separately in the transformer module. The ratio of the numbers of turns of a primary coil and a secondary coil in the set of small electromagnetic coils is configured to transform the DC power source output by the rectifying circuit into the desirable DC power source VDD to power those components in the DC-charging power source adaptor to provide the components with desirable DC operating voltage, e.g., the controller, the digital potentiometer, the current detecting chip, and other components to thereby enable them to operate The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer module and the ground. Particularly one end P0A of the resistor body is connected with the anode of the secondary coil in the other set of electromagnetic coils through the current-limiting resistor R1 connected in series, and the other end P0B of the resistor body is grounded. An intermediate tap P0W of the resistor body is connected with a reference voltage pin VREF of the synchronous rectification controller, and if the resistance value of the valid resistor of the digital potentiometer varies, then the voltage value of the charging voltage output by the other set of electromagnetic coils in the transformer module will be adjusted in order to maintain the reference voltage on the reference voltage pin VREF of the synchronous rectification controller. In order to adjust the volt value of the charging voltage, the synchronous rectification controller adjusts its output control signal to the varying resistance value of the valid resistor of the digital potentiometer, and transmits the control signal to the PWM controller after the control signal is optic-electrically isolated by the optical coupler, to thereby adjust a duty ratio of a PWM signal output by the PW controller. The PWM signal is transmitted to the transformer module, and particularly can be transmitted to a switch transistor connected in series with the secondary coil in the other set of electromagnetic coils, to control the switch transistor to be switched on and off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer module can be finely adjusted in the range of 3.6V to 12V to thereby charge different mobile terminals as required in reality.

In order to achieve the stability of the charging voltage output by the transformer module, in this embodiment, instead of a traditional rectification scheme in which a diode is connected in series on a charging voltage transmission line, the power MOS transistor is connected on the charging voltage transmission line and switched on or off by the switching signal output by the synchronous rectification controller to thereby shape the waveform of the charging voltage output by the transformer module.

In this embodiment, the power MOS transistor can be embodied as an NMOS transistor connected between the cathode of the secondary coil in the other set of electromagnetic coils and the ground pin Gnd of the charging interface Jo. Since the DC-charging power source adaptor supports an output of large current, if the charging voltage output by the transformer module is shaped by the diode, then power consumption of the DC-charging power source adaptor may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the DC-charging power source adaptor can be lowered effectively and the efficiency in charging the mobile terminal can be improved.

In order to detect in real time charging current output by the transformer module to thereby improve the safety in charging, in this embodiment, a sampling resistor R6 is further connected in series in the transmission line of the charging current, as illustrated in FIG. 2, preferably between the anode of the secondary coil in the other set of electromagnetic coils in the transformer module and the power source pin Vbus of the charging interface Jo, and inputs −IN and +IN of the current detecting chip are connected with two ends of the sampling resistor R6 to acquire a voltage drop across the resistor R6, and after the voltage drop is amplified, the magnitude of the charging current is calculated from the voltage drop and the resistance value of the sampling resistor R6. The current detecting chip generates sample voltage corresponding to the calculated magnitude of the charging current, and transmits the sample voltage to an ADC interface AD1 of the controller through an output OUT thereof, and the sample voltage is analog-to-digital converted by the controller into the magnitude of the charging current, so the controller can detect in real time the charging current.

If the range of the amplitude of the sample voltage output by the current detecting chip exceeds an interface voltage range specified by the ADC interface AD1 of the controller, then the ADC interface of the controller may be damaged. In order to protect the controller, an offload circuit can be additionally arranged between the output OUT of the current detecting chip and the ADC interface AD1 of the controller, e.g., a resistor offload circuit composed of resistors R4 and R5, to adjust the voltage signal output by the current detecting chip within the interface voltage range acceptable to the AD1 interface of the controller so as to avoid the ADC interface AD1 of the controller from being damaged due to the input voltage being too high.

In order to improve the safety in charging so that the DC-charging power source adaptor can have the charging power source disconnected rapidly upon abnormal charging occurring to thereby avoid the mobile terminal from being damaged, in this embodiment, a switch transistor Q1 supporting large current passing is further arranged in the charging power source transmission line of the DC-charging power source adaptor so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor can be embodied preferably as a pair of NMOS transistors Q1 in which parasitic diodes connected in anti-parallel are built, as illustrated in FIG. 2. The pair of NMOS transistors Q1 are switched on and connected in series in the transmission line of the charging power source, where the sources of the two NMOS transistors in the pair of NMOS transistors Q1 can be connected, the drains of the two NMOS transistors can be connected respectively with the anode of the secondary coil in the other set of electromagnetic coils in the transformer module, and the power source pin Vbus of the charging interface Jo; and then the gates of the two NMOS transistors can be connected with the boosting circuit. An enable end of the boosting circuit is connected with the controller to receive an enable signal output by the controller. During charging, if the controller detects normal charging current, then the controller will output the valid enable signal to control the boosting circuit to be enabled into operation to boost the DC power source output by the transformer module to the switch voltage higher than the volt value of the charging voltage, and the switch voltage is output to the gates of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller will output the invalid enable signal to control the boosting circuit to stop operating. At this time the pair of NMOS transistors Q1 is switched off due to the disappearing voltage at the gates thereof, to thereby have the transmission line of the charging power source disconnected to block the charging power source from outputting to the outside, so that the DC-charging power source adaptor can be controlled to stop powering the mobile terminal.

A charging method operating on the mobile terminal and the DC-charging power source adaptor will be described below with reference to the hardware configurations illustrated in FIG. 1 and FIG. 2.

Figure 4:
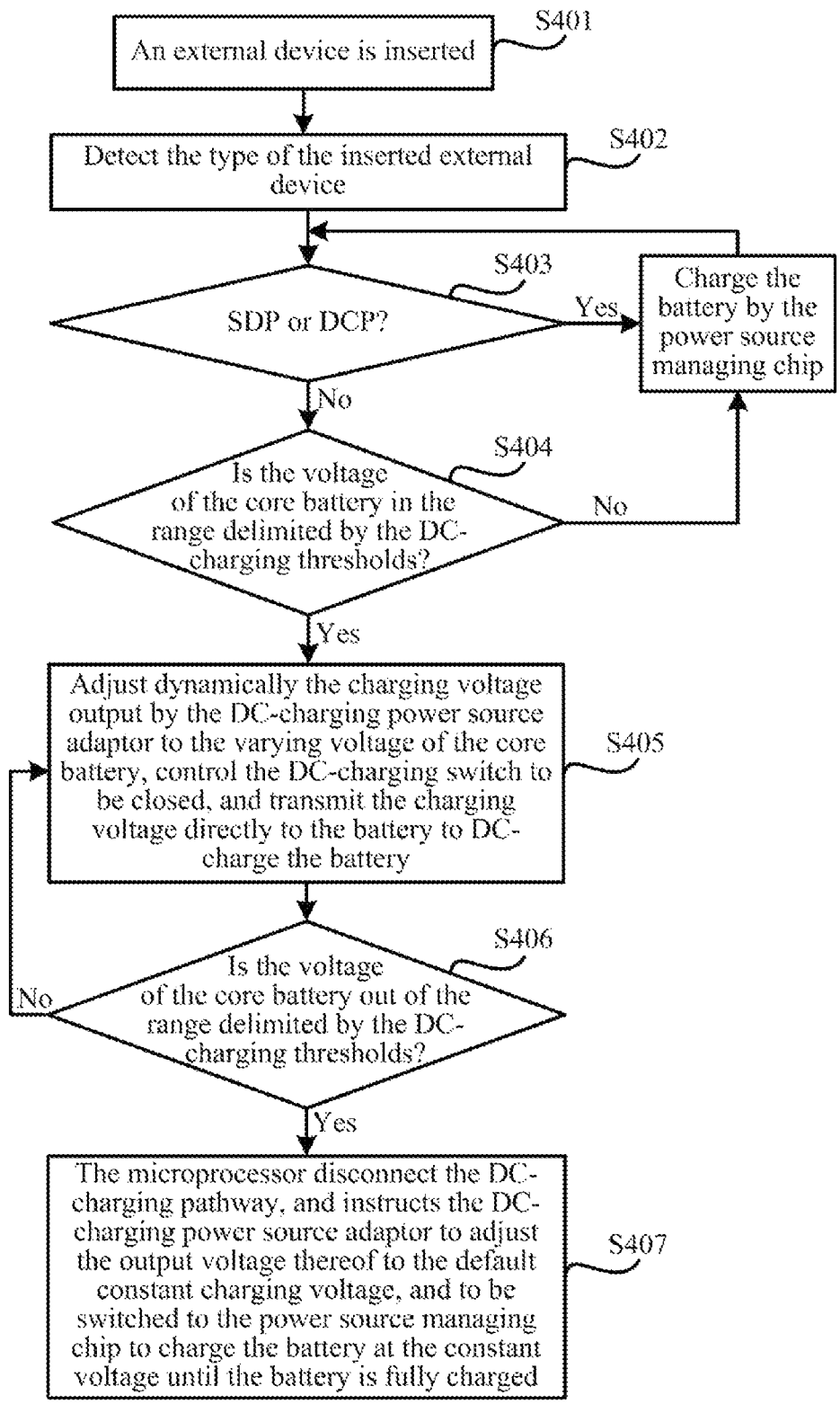
FIG. 4 is a flow chart of a process of an embodiment of a charging method according to the disclosure.

As illustrates in FIG. 4, the charging control flow thereof generally involves the following steps:

S401. The mobile terminal detects an inserted external device, and performs subsequent steps upon detecting an external device being inserted.

In this embodiment, an inserted external device can be detected as in the prior art, for example, by detecting a DC power source accessing the power source pin VBUS of the USB interface Ji of the mobile terminal. In the traditional host charging mode SDP and normal power source adaptor charging mode DCP, the charging voltage output by the host and the normal power source adaptor is typically 5V; and the DC-charging power source adaptor can be configured to output by default the same constant charging voltage as the host and the normal power source adaptor, e.g., 5V constant charging voltage so that the mobile terminal can substantially determine whether the DC-charging power source adaptor is inserted.

Of course the 5V constant charging voltage here only relates to an embodiment, and for some mobile terminal to be charged at constant voltage of another volt value, the DC-charging power source adaptor will be simply configured to output by default the same constant charging voltage as the charging voltage output by the normal power source adaptor when the normal power source adaptor powers the mobile terminal.

S402. The mobile terminal detects the type of the inserted external device.

In this embodiment, the mobile terminal operates by default without being DC-charged, that is, the microprocessor in the mobile terminal controls by default the DC-charging switch to be opened to have the power source pin VBUS of the USB interface Ji connected with the power source managing chip. Also the microprocessor controls the gating switch to be kept in the default state to have the differential data pins D+ and D− of the USB interface Ji connected with the differential data interfaces DP and DN of the microprocessor.

Figure 3:
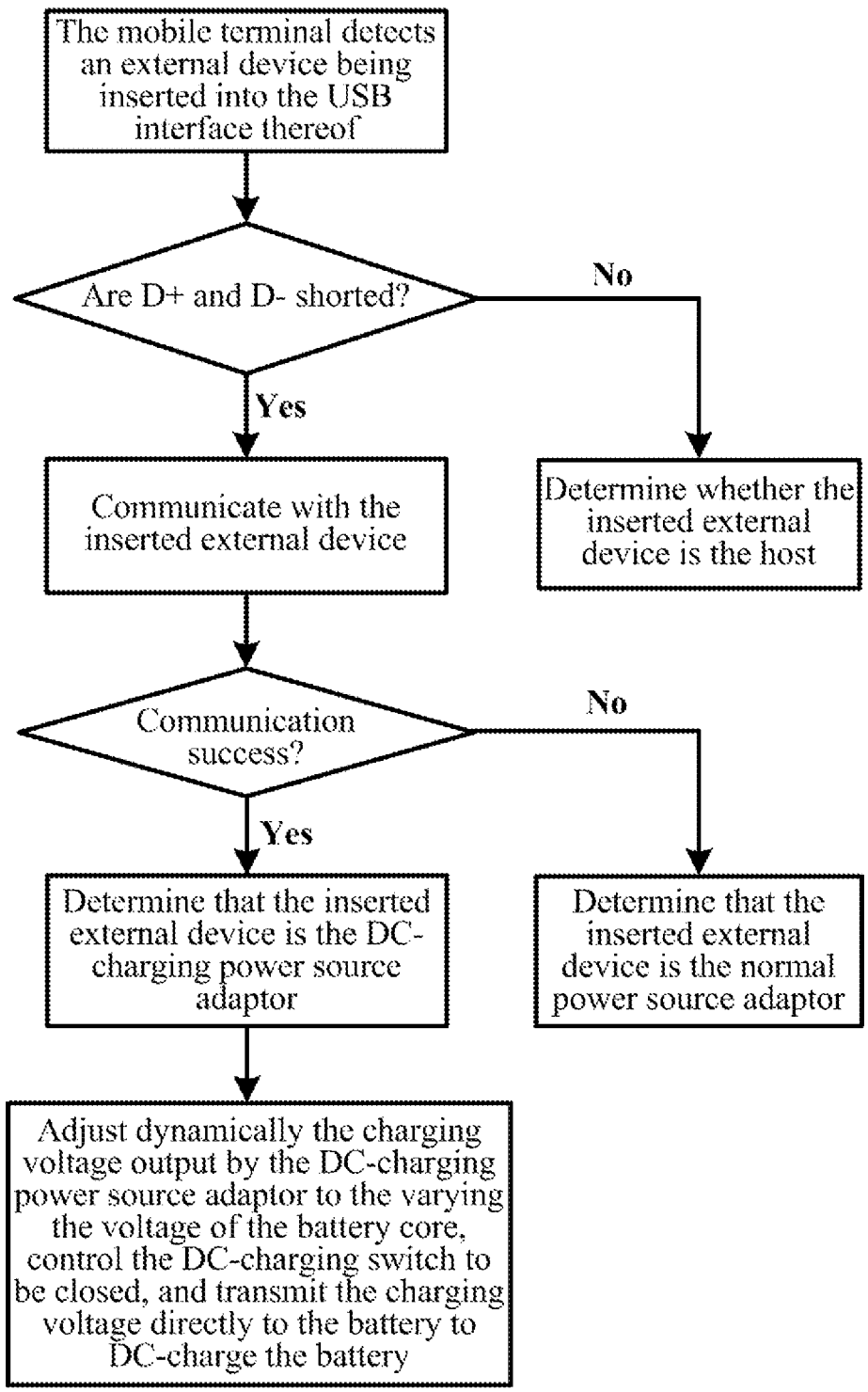
FIG. 3 is a flow chart of a process of an embodiment of a charging method according to the disclosure.

Whether the inserted external device is the host or the normal power source adaptor can be determined as in the existing BC1.2 charging type detection scheme. Of course this can alternatively be determined particularly as follows, as illustrated in FIG. 3:

If the mobile terminal detects an external device being inserted into the charging interface thereof, then the microprocessor firstly determines whether the differential data pins D+ and D− of the USB interface Ji are shorted, and if not so, then the mobile terminal determines that the inserted external device is the host because the existing host (particularly the computer host) typically is connected and communicates with and powers the mobile terminal through the USB data line. Of course the mobile terminal can further conduct USB communication with the externally inserted external device via the differential data interfaces DP and DN of the microprocessor to further determine whether the inserted external device is the host. If it is detected that the differential data pins D+ and D− of the USB interface Ji are shorted, then the mobile terminal determines that the inserted external device is a power source adaptor because the communication pins of the existing normal power source adaptor typically are configured to be shorted. Moreover in this embodiment, in order to be identified by the mobile terminal in the same way as the normal power source adaptor, the communication pins Tx and Rx of the DC-charging power source adaptor can also be configured to be shorted by default. If the mobile terminal determines that the inserted external device is a power source adaptor, then the mobile terminal can communicate with the externally connected power source adaptor to further determine whether the inserted external device is the normal power source adaptor or the DC-charging power source adaptor. Particularly if the microprocessor detects that the differential data pins D+ and D− of the USB interface Ji of the mobile terminal are shorted, then the microprocessor firstly controls the gating switch to operate to switch the differential data pins D+ and D− of the USB interface Ji to be connected with the UART interfaces TXD and RXD of the microprocessor. Then the microprocessor outputs a specific pulse waveform to the externally connected power source adaptor through the UART interfaces TXD and RXD of the microprocessor in a preset period of time. After the preset period of time expires, the microprocessor initiates a communication command on its own initiative to the externally connected power source adaptor in the UART communication mode, and if a valid response command fed back by the externally connected power source adaptor is received, then the microprocessor determines that the inserted external device is the DC-charging power source adaptor (because at this time the DC-charging power source adaptor has the communication pins Tx and Rx of the charging interface Jo thereof switched from being shorted to be connected with the UART interfaces TX2 and RX2 of the controller thereof); otherwise, the microprocessor determines that the inserted external device is the normal power source adaptor.

Of course, the microprocessor can alternatively determine this otherwise, for example, after the microprocessor controls the UART interfaces TXD and RXD thereof to be connected with the respective differential data pins D+ and D− of the USB interface Ji, the microprocessor waits for reception of a UART communication command initiated by the DC-charging power source adaptor on its own initiative. If the UART communication command is received in a preset wait period of time, then the mobile terminal determines that the inserted external device is the DC-charging power source adaptor; otherwise, the mobile terminal determines that the inserted external device is the normal power source adaptor. Alternatively the microprocessor is timed to send a UART communication command to the externally connected power source adaptor, and waits for a response command fed back by the external power source adaptor, in a preset wait period of time, and if a valid response command is received, then the mobile terminal determines that the inserted external device is the DC-charging power source adaptor; otherwise, the mobile terminal determines that the inserted external device is the normal power source adaptor.

Figure 5:
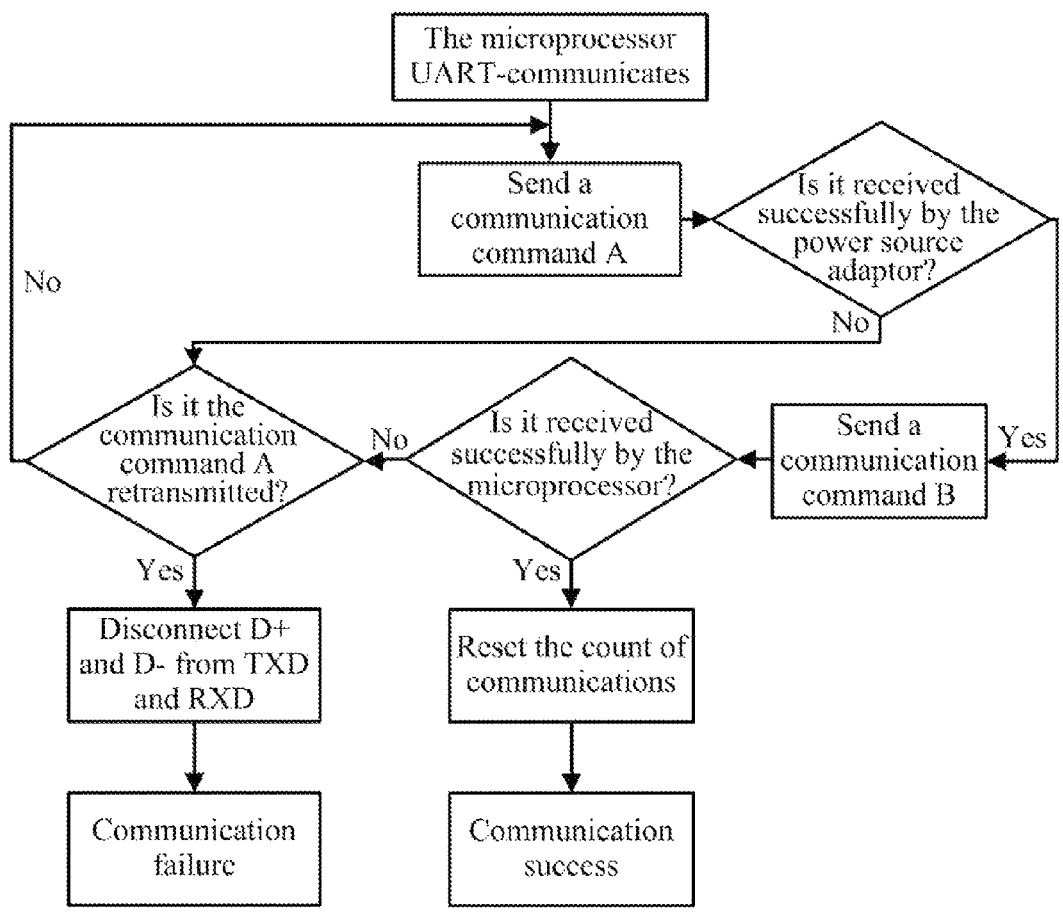
FIG. 5 is a flow chart of an embodiment of detecting communication between the mobile terminal and the DC-charging power source adaptor illustrated in FIG. 1.
Figure 6:
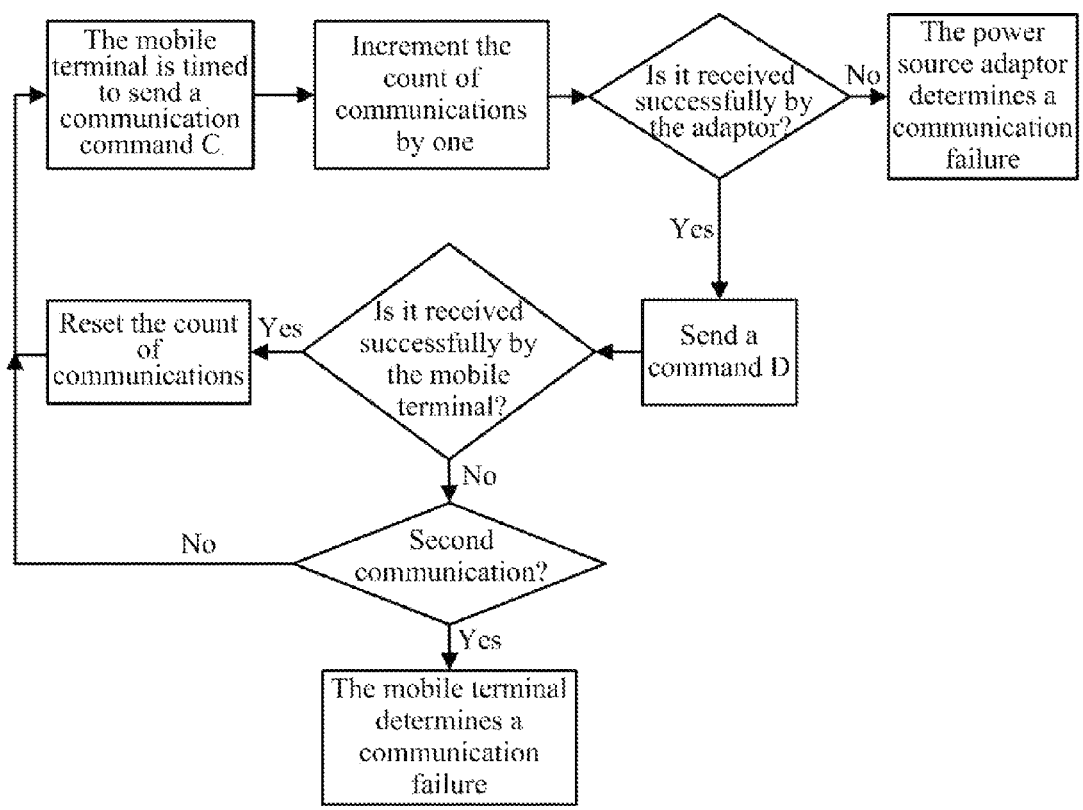
FIG. 6 is a flow chart of an embodiment of a timed detection mechanism of communication between the mobile terminal and the DC-charging power source adaptor illustrated in FIG. 1.

If the microprocessor determines that the inserted external device is the DC-charging power source adaptor, in order to enable a better switching mechanism and error-tolerant mechanism, in this embodiment, communication between the mobile terminal and the DC-charging power source adaptor can be detected in this embodiment preferably as follows, as illustrated in FIG. 5:

The microprocessor initiates a communication command A on its own initiative to the external power source adaptor after switching the communication interface of the microprocessor from the differential data interfaces DP and DN to the UART interfaces TXD and RXD, and also counts the number of communications. The DC-charging power source adaptor receiving successfully the communication command A can respond accordingly by sending a communication command B to the mobile terminal, and if the mobile terminal does not receive any valid communication command B, then the microprocessor firstly determines the count of communications at that time, and if the count of communications is less than 2, then the microprocessor retransmits the communication command A for a second attempt on communication; and if the count of communications is more than or equal to 2, then the microprocessor determines that the communication fails, and disconnects the differential data pins D+ and D− of the USB interface Ji of the mobile terminal from the UART interfaces TXD and RXD of the microprocessor to resume the original state where the differential data pins D+ and D− of the USB interface Ji are connected with the differential data pins DP and DN of the microprocessor. If the mobile terminal receives successfully the communication command B, then the microprocessor determines that the communication succeeds, and resets the count of communications, and thereafter can start a timed communication detecting mechanism as illustrated in FIG. 6.

In the timed communication detecting mechanism, the mobile terminal is timed to send a handshake instruction, e.g., a communication instruction C, to the DC-charging power source adaptor, and also increments the count of communications by one; and if the DC-charging power source adaptor receives successfully the communication instruction C, then it feeds immediately a response instruction back to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the DC-charging power source adaptor, and if both of the communications fail, then the mobile terminal determines that the DC-charging power source adaptor engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S403. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the host is inserted) or the standard DCP charging mode (if the normal power source adaptor is inserted).

Particularly the microprocessor controls the DC-charging switch to be kept in the defaulted Off state, and also starts the power source managing chip to receive the charging voltage input by the host or the normal power source adaptor, and to enter different charging phases according to current voltage of the battery core. By way of an example, for a 4.2V chargeable battery (4.2V voltage of the core battery being fully charged), if the core voltage is less than 3.5V, then the power source managing chip enters a small-current pre-charging phase in which 500 mA charging current is output, and the battery is pre-charged at the small current. If the voltage of the core battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the voltage of the core battery to rise from 3.5V to 4.1V. If the voltage of the core battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the DC-charging power source adaptor, then the mobile terminal operates in a subsequent rapid charging mode.

S404. The mobile terminal determines whether the voltage of the core battery lies in a range delimited by DC-charging thresholds, and if so, then the mobile terminal performs a subsequent large-current DC-charging process; otherwise, the battery is charged by the source power managing chip.

In this embodiment, the DC-charging thresholds (a lower voltage threshold S1 and an upper voltage threshold S2) can be determined particularly dependent upon the real condition of the battery to preferably agree with the voltage range of the battery corresponding to the constant-current charging phase in the normal DCP charging mode. For example, the lower voltage threshold S1 and the upper voltage threshold S2 of the 4.2V chargeable battery above can be set to S1=3.5V and S2=4.1V. If the voltage Vbat_real of the battery core is Vbat_real<3.5V or Vbat_real>4.1V, then the microprocessor controls the DC-charging switch to be kept in the default Off state, and also starts the power source managing chip to receive the constant charging voltage input by the DC-charging power source adaptor, e.g., DC 5V charging voltage, to pre-charge the battery at small current (for Vbat_real<3.5V) or at constant voltage (for Vbat_real>4.1V), that is, the battery is charged in the same charging mode as the host and the normal power source adaptor. If the voltage Vbat_real of the battery core is detected in the range [3.5V, 4.1V] delimited by the DC-charging thresholds, then the mobile terminal enters the subsequent DC-charging process.

S405. The mobile terminal communicates with the DC-charging power source adaptor via the UART interfaces thereof, adjusts dynamically the charging voltage output by the DC-charging power source adaptor to the varying voltage of the core battery, and controls the DC-charging switch to be closed to short the power source managing chip so that the power source managing chip stops operating, and the charging voltage is transmitted directly to the battery to DC-charge the battery.

In this embodiment, the charging voltage can be adjusted dynamically in any one of the following three preferred designed approaches:

In a first designed approach, a relationship reference table between the voltage of the core battery and the target charging voltage is preset in the mobile terminal, the voltage of the core battery is detected, and the reference table is searched using the core voltage for the target charging voltage corresponding to the core voltage to control the voltage output of the DC-charging power source adaptor.

The voltage of the core battery can be divided into several intervals according to the range [S1, S2] delimited by the DC-charging thresholds, for example, the core voltage is divided into N intervals at a step of 100 mV, where N=(S2-S1)/100 mV. For each interval, a target charging voltage value Vout, a target charging current value Itarg, and a charging current maximum value Imax corresponding to the core voltage in the interval are predetermined, and the reference table is created and stored in the microprocessor, or in a memory in the mobile terminal, connected with the microprocessor for invoking by the microprocessor.

Figure 7:
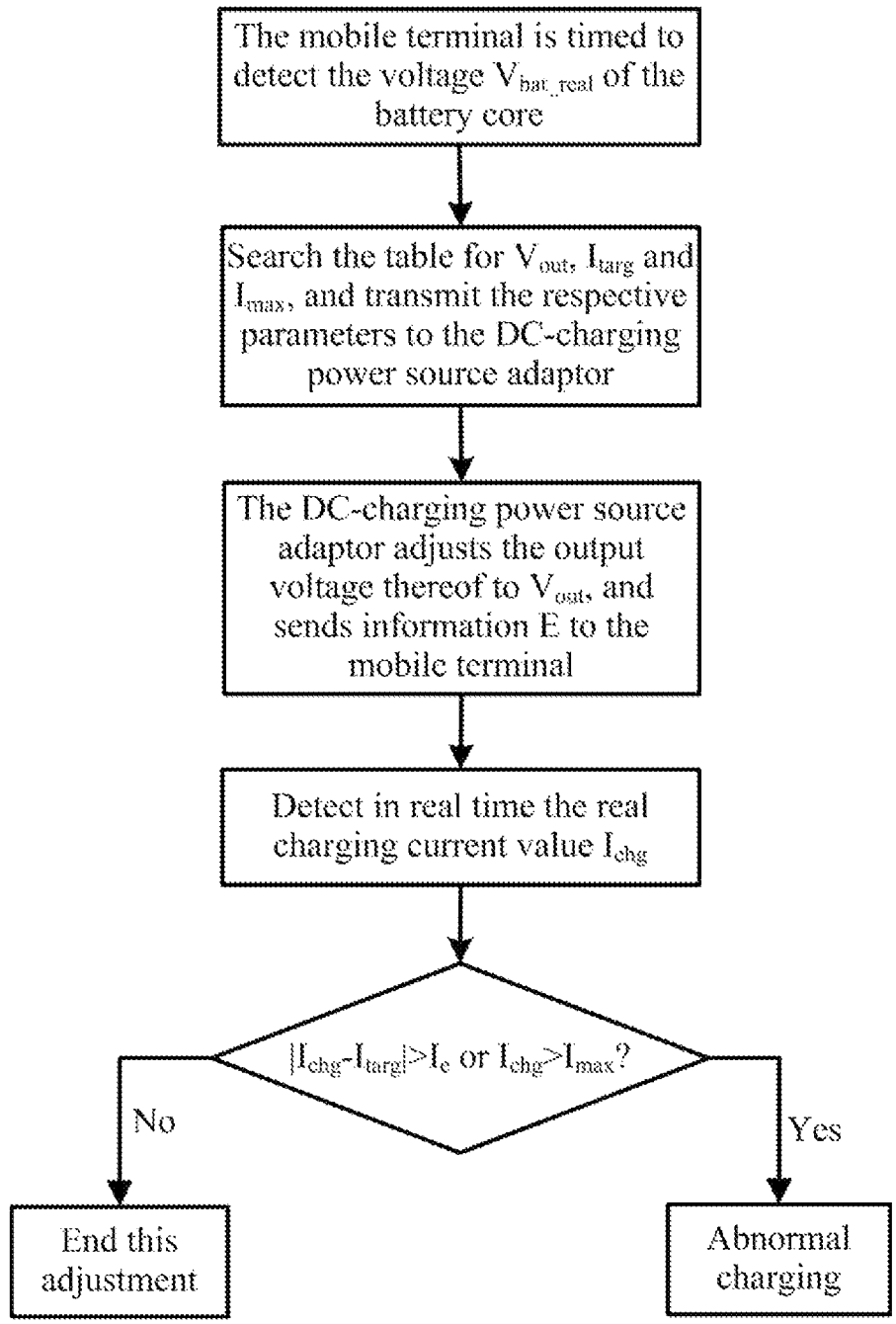
FIG. 7 is a flow chart of control in an embodiment of a DC-charging control strategy using a lookup table.

After entering the DC-charging process, as illustrated in FIG. 7, the microprocessor is timed to detect the voltage Vbat_real of the battery core, searches the reference table using the detected core voltage Vbat_real, determines the core voltage interval in which the core voltage Vbat_real lies, and then searches using the determined interval for the target charging voltage value Vout, the target charging current value Itarg, and the charging current maximum value Imax corresponding to the interval. Thereafter the microprocessor conducts UART communication with the DC-charging power source adaptor, and sends the target charging voltage value Vout, the target charging current value Itarg, and the charging current maximum value Imax to the DC-charging power source adaptor.

At the DC-charging power source adaptor side, the DC-charging power source adaptor adjusts the resistance value of the valid resistor of the digital potentiometer thereof according to the received target charging voltage value Vout to thereby change the charging voltage output by the AC-DC module thereof to the target charging voltage value Vout. At the end of the adjusting, the DC-charging power source adaptor sends information E to the mobile terminal, detects in real time the real charging current Ichg output by the AC-DC module, through the current detecting chip, and if |Ichg−Itarg|>Ie (Ie represents a controllable range of the difference between the real charging current value of the DC-charging power source adaptor and the target charging current value, and can be set to Ie=500 mA in this embodiment), or Ichg>Imax, then the DC-charging power source adaptor determines abnormal charging. At this time in order to ensure the safety in charging, the DC-charging power source adaptor outputs the invalid enable signal through the controller therein, as illustrated in FIG. 2, to control the boosting circuit to stop outputting the switch voltage, and to further control the pair of MNOS transistors Q1 to be switched off to thereby block the charging power source output by the AC-DC module from being transmitted to the mobile terminal. If |Ichg−Itarg|≤Ie and Ichg≤Imax, then the DC-charging power source adaptor ends this adjusting process, and DC-charges at large current the battery in the mobile terminal using the adjusted charging voltage, where the charging current here can rise beyond 3500 mA, to thereby significantly speed up charging.

The following preferred scheme to create the reference table is proposed in this embodiment:

A number i of intervals, denoted as xi1~xi2, are set for the core voltage in the range of [S1, S2];

For each of the intervals [xi1, xi2], a target charging voltage value Vout, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat}, I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which preferably lies in the range of [150 mA, 250 mA]; and The reference table is created from the parameters Vbat_real, Vout, Itarg and Imax.

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a preferred designed implementation of this embodiment, the target charging voltage value Vout and the charging current maximum value Imax corresponding to each interval [xi1, xi2] can be calculated preferably as follows: a lower bound xi1 of the core voltage in the interval is used as Vbat_real and substituted into Equation (1) to calculate the target charging voltage value Vout corresponding to the interval; an upper bound xi2 of the core voltage in the interval is used as Vbat_real and substituted into Equation (3) to calculate the charging current maximum value Imax corresponding to the interval; and further the target charging current value Itarg is derived from calculated Imax in Equation (2), and the reference table is created.

By way of an example, still taking the 4.2V chargeable battery as an example, for the system powered by the battery, from the perspective of the safety of voltage to power the device, the terminal voltage Vbat of the battery shall not be more than a specific Vbat_max dependent upon the platform, and less than the specified safe value Vbat_safe of the terminal voltage of the battery. If the safe value Vbat_safe of the terminal voltage of the battery is Vbat_safe=4500 mV, then Vbat_max=4470 mV can be taken, so the terminal voltage Vbat of the battery is Vbat=Vbat_real+Ichg*Rbat≤4470.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat}, 4000) \quad (5)$$

If the inner resistance $R_{bat}$ of the battery is $R_{bat}$=100 mΩ, the other impedance is $R_{line}+R_{board}$=100 mΩ, and the range delimited by the DC-charging thresholds of the battery is [3500 mV, 4100 mV] at a step of 100mV, then the range [3500 mV, 4100 mV] delimited by the DC-charging thresholds can be divided into 6 intervals; an upper bound of the core voltage in each interval is substituted into Equation (5) to calculate the charging current maximum value $I_{max}$; the target charging current value $I_{targ}$ is derived from calculated $I_{max}$ in Equation (2), and ΔI=200 mA is taken in this embodiment; and a lower bound of the core voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the voltage of the core battery, and the charging current and the charging voltage output by the adaptor, but there may be a minor error relative to the real correspondence relationship, so the battery can be experimentally charged, the charging voltage varying with the varying charging current is recorded, and the values of the parameters in the reference table are adjusted, for example, the values of the respective parameters in the reference table are adjusted to their ideal values by averaging them.

The target charging voltage obtained by looking up from the table is a theoretical value, and in reality, the inner resistance of the battery, and the impedance on the line may vary with temperature, aging, and other factors, so the real charging current value $I_{chg}$ output by the DC-charging power source adaptor may deviate to some extent from the target charging current value $I_{targ}$, thus resulting in some influence upon the charging speed. In order to raise the charging current as much as possible in an allowable range to further speed up charging, in this embodiment, a charging current self-adjusting algorithm is introduced at the DC-charging power source adaptor side, that is, after the DC-charging power source adaptor adjusts the output voltage to $V_{out}$, if $I_{targ}-I_e \leq I_{chg} < I_{targ}$, then $V_{out}=V_{out}+\Delta V$ is adjusted progressively so that the real charging current value $I_{chg}$ output by the DC-charging power source adaptor approaches progressively the target charging current value $I_{targ}$.

In this embodiment, $V_{out}$ can be adjusted preferably for five times by an amount which can be estimated in Equation (1), and if $V_{bat\_real}$ and R (including the inner resistance of the battery, the line resistance, and all the other impedances) are invariable, then $\Delta V=\Delta I*R$. In this embodiment, ΔV is preferably set to ΔV=10 mV.

In a second designed approach, a relationship reference table between the voltage of the core battery and the target charging voltage is preset at the DC-charging power source adaptor side, and the DC-charging power source adaptor searches the reference table using the received core voltage (detected and provided by the mobile terminal) for the target charging voltage value corresponding to the core voltage. Thereafter the DC-charging power source adaptor adjusts the output voltage thereof to the target charging voltage value to DC-charge the battery built in the mobile terminal at large current.

Reference can be made for the related description in the first designed approach above for creation of the reference table.

Noted that after entering the DC-charging process, at the mobile terminal side, the microprocessor is timed to detect the voltage $V_{bat\_real}$ of the battery core, conducts UART communication with the DC-charging power source adaptor, and is timed to send the detected core voltage $V_{bat\_real}$ to the DC-charging power source adaptor.

At the DC-charging power source adaptor side, the DC-charging power source adaptor searches the stored reference table thereof using the received core voltage $V_{bat\_real}$, determines the core voltage interval in which the core voltage $V_{bat\_real}$ lies, and then searches using the determined interval for the target charging voltage value $V_{out}$, the target charging current value $I_{targ}$, and the charging current maximum value $I_{max}$ corresponding to the interval. Then the controller adjusts the resistance value of the valid resistor of the digital potentiometer to thereby change the charging voltage output by the AC-DC module thereof to the target charging voltage value $V_{out}$. At the end of the adjusting, the DC-charging power source adaptor sends information E to the mobile terminal, and sends $I_{targ}$ and $I_{max}$ to the mobile terminal for detection of abnormal charging. At the same time the DC-charging power source adaptor detects in real time the real charging current value $I_{chg}$ output by the AC-DC module, through the current detecting chip thereof, and if $|I_{chg}-I_{targ}|>I_e$, or $I_{chg}>I_{max}$, then the DC-charging power source adaptor determines abnormal charging, disconnects the charging power source from being output, and stops charging the mobile terminal. If $|I_{chg}-I_{targ}|\le I_e$, and $I_{chg}\le I_{max}$, then the DC-charging power source adaptor ends this adjusting process.

Also the charging current self-adjusting algorithm described in the first designed approach above can be introduced at the DC-charging power source adaptor side so that the real charging current value $I_{chg}$ output by the DC-charging power source adaptor can approach progressively the target charging current value $I_{targ}$ to thereby further speed up charging.

The table-lookup approach above relating to segmented constant-current-like charging can reduce the count of times that the output voltage of the DC-charging power source adaptor is adjusted, but the output voltage is constant for a period of time, and the charging current is decreasing gradually with the ever rising voltage of the core battery, thus resulting in some influence upon the charging speed of the battery.

In order to enable the charging current to be maintained at a stable high level, DC-charging control by following in real time the varying core voltage is proposed in this embodiment as described in details in the following third designed approach.

In the third designed approach, the target charging voltage value is adjusted in real time by following dynamically the varying voltage of the core battery.

Figure 8:
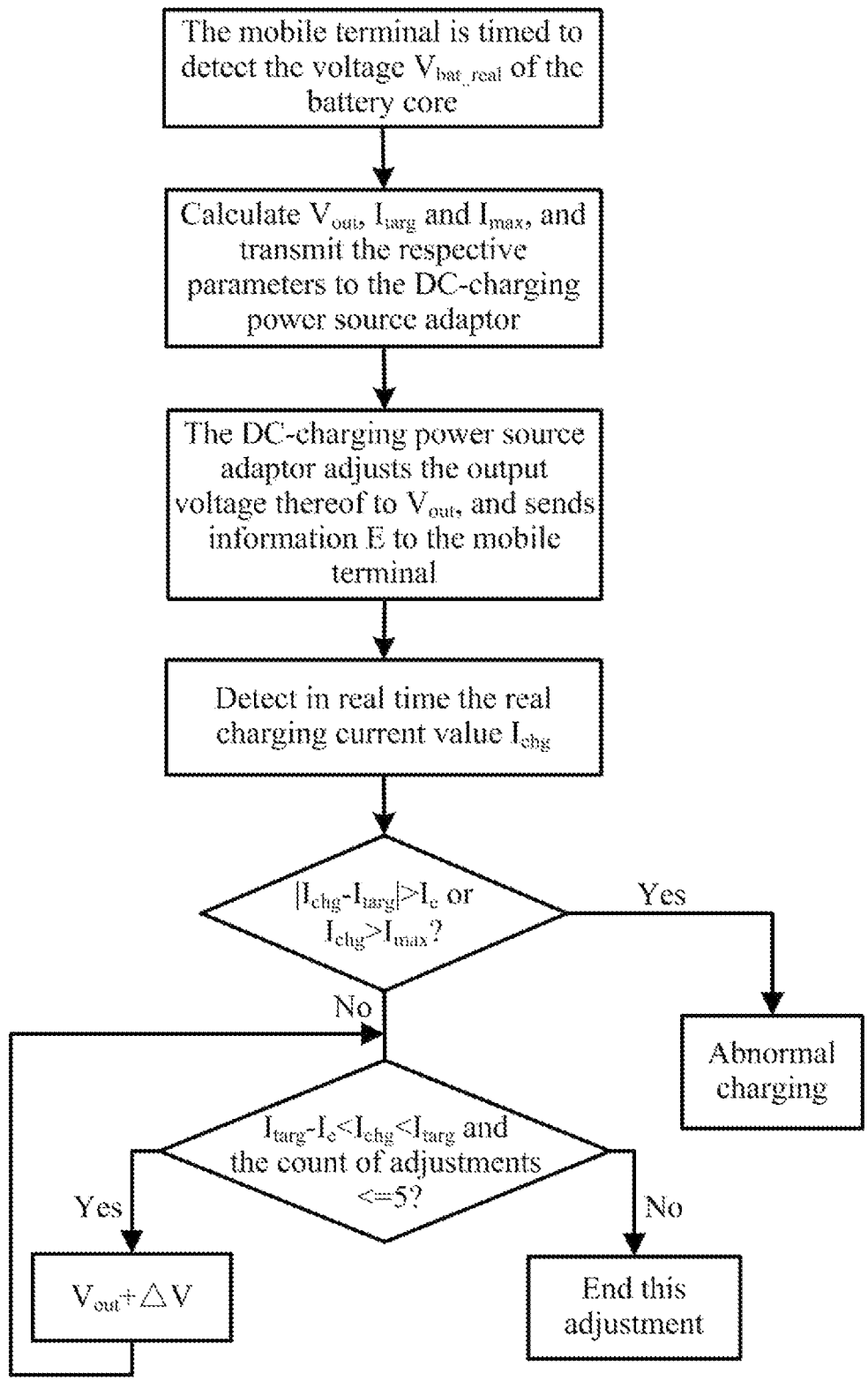
FIG. 8 is a flow chart of control in an embodiment of a voltage-following DC-charging control strategy.

As illustrated in FIG. 8, after entering the DC-charging process, the microprocessor in the mobile terminal is timed to detect the voltage Vbat real of the battery core, calculates the target charging voltage value Vout, the target charging current value Itarg, and the charging current maximum value Imax in Equations (1) to (4), and sends these values to the DC-charging power source adaptor.

The DC-charging power source adaptor adjusts the resistance value of the valid resistor of the digital potentiometer thereof according to the received target charging voltage value Vout to thereby adjust the charging voltage output by the AC-DC module thereof to the target charging voltage value Vout. At the end of the adjusting, the DC-charging power source adaptor sends information E to the mobile terminal, and also detects the charging current Ichg output by the DC-charging power source adaptor, through the current detecting chip, and if |Ichg−Itarg|>Ie or Ichg>Imax, then the DC-charging power source adaptor determines abnormal charging, disconnects the charging power source from being output by the DC-charging power source adaptor to the outside, and notifies the mobile terminal of abnormal charging. If |Ichg−Itarg|≤Ie and Ichg≤Imax, then the DC-charging power source adaptor ends this adjusting process, or starts the charging current self-adjusting algorithm above to finely adjust the charging voltage for at most five times (or another number of times), so that the real charging current value Ichg output by the DC-charging power source adaptor approaches progressively the target charging current value Itarg to thereby speed up charging as much as possible.

S406. The mobile terminal determines whether the voltage of the core battery exceeds the range delimited by the DC-charging thresholds, and if not, then the flow returns to the step S405; otherwise, the flow proceeds to a subsequent step.

S407. The microprocessor controls the DC-charging switch to be opened to disconnect the DC-charging pathway, and instructs the DC-charging power source adaptor to adjust the output voltage thereof to the default constant charging voltage, e.g., 5V DC-charging voltage, and to start the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the mobile terminal side (1) The mobile terminal detecting that it is being powered by the DC-charging power source adaptor is timed to send a handshake instruction to the DC-charging power source adaptor, and waits for a preset period of time until the DC-charging power source adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power source adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power source adaptor to output the constant charging voltage, e.g., 5V DC voltage;

(4) After entering the DC-charging process, the mobile terminal detects in real time the received real charging current value Ichg, and if the absolute value of the difference between Ichg and Itarg goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value Ichg, and if Ichg is more than Imax, then it disconnects the DC-charging pathway between the charging interface of the mobile terminal and the battery, and notifies the user of the power source adaptor being abnormal 2. At the DC-charging power source adaptor side (1) The DC-charging power source adaptor obtaining the target charging voltage value Vout, the target charging current value Itarg, and the charging current maximum value Imax detects in real time its output real charging current value Ichg, and if the absolute value of the difference between Ichg and Itarg goes beyond the preset controllable range of the difference, then the DC-charging power source adaptor stops outputting the charging power source, and flicks a lamp to alert the user;

(2) After entering the DC-charging process, the DC-charging power source adaptor detects in real time its output real charging current value Ichg, and if Ichg is more than Imax, then it determines abnormal charging, and disconnects the charging power source from being output to avoid the mobile terminal from being damaged due to being further powered.

Of course, the mobile terminal and the DC-charging power source adaptor can alternatively exchange data wirelessly with each other as illustrated in FIG. 2. Particularly a wireless communication module, e.g., Bluetooth, WiFi, or another wireless communication module can be arranged in the controlling module of the DC-charging power adaptor to be connected with the controller, possibly another branch of UART interfaces TX1 and RX1 of the controller; and a matching wireless communication module, e.g., a Bluetooth chip, can be arranged in the mobile terminal to be connected with the microprocessor. If the mobile terminal needs to exchange data with the DC-charging power adaptor, then communication instructions generated by the microprocessor and the controller can be sent to the wireless communication modules connected therewith for conversion into a wireless signal sent to their counterparts. Due to the wireless communication, such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

The charging method according to this disclosure can be widely applied to a handset, a tablet computer, a notebook computer, a mobile power source, and other mobile terminals so as to satisfy different charging demands of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal, comprising:
a battery configured to store electrical energy;
a USB interface configured to be engaged with an external device; and
a microprocessor configured to determine whether two differential data pins of the USB interface are shorted, upon detecting an external device being inserted into the USB interface; and if so, to communicate with the inserted external device, wherein if the external device is a DC-charging power source adaptor, then the DC-charging power source adaptor switches two communication pins of a charging interface thereof from being shorted by default to being disconnected, and communicates with the microprocessor; and the microprocessor detects voltage of the battery after communicating successfully with the DC-charging power source adaptor, and if the voltage of a battery core lies in a range delimited by preset DC-charging thresholds, then the microprocessor controls the battery to be DC-charged using charging voltage output by the DC-charging power source adaptor, and determines a value of the charging voltage of the DC-charging power source adaptor from the current voltage of the battery core.

2. The mobile terminal of claim 1, further comprising:
a DC-charging switch, connected between the USB interface and the battery, configured to be controlled by the microprocessor upon detecting that the voltage of the battery core lies in the range delimited by the preset DC-charging thresholds, to be closed to transmit the charging voltage output by the DC-charging power source adaptor directly to the battery to DC-charge the battery; and
a power source managing chip, connected between the USB interface and the battery, configured to be controlled by the microprocessor upon detecting that the voltage of the battery core goes out of the range delimited by the preset DC-charging thresholds, to receive the charging voltage output by the DC-charging power source adaptor to charge the battery.

3. A method for charging a mobile terminal, the method comprising:
determining, by the mobile terminal, whether two differential data pins of a USB interface thereof are shorted, upon detecting an external device being inserted into the USB interface;
if so, then communicating with the inserted external device;
if the external device is a DC-charging power source adaptor, then switching, by the DC-charging power source adaptor, two communication pins of a charging interface thereof from being shorted by default to being disconnected, and communicating with the mobile terminal; and
detecting, by the mobile terminal, voltage of the battery after communicating successfully with the DC-charging power source adaptor, and if the voltage of a battery core lies in a range delimited by preset DC-charging thresholds, then charging the battery directly using charging voltage output by the DC-charging power source adaptor, and determining a value of the charging voltage of the DC-charging power source adaptor from the current voltage of the battery core.

4. The method for charging a mobile terminal of claim 3, wherein communicating, by the mobile terminal, with the inserted external device comprises:
outputting, by the mobile terminal, a specific pulse waveform to the external device; and
exchanging, by the mobile terminal, a handshake instruction with the external device after a preset delay period of time, and if the handshake succeeds, then determining that the inserted external device is the DC-charging power source adaptor.

5. The method for charging a mobile terminal of claim 3, wherein communicating, by the mobile terminal, with the inserted external device comprises:
waiting, by the mobile terminal, for reception of a communication command sent by the external device in a preset wait period of time, and if the communication command is received, then determining that the inserted external device is the DC-charging power source adaptor; or
sending, by the mobile terminal, a communication command to the external device at preset instances of time, and waiting for reception of a response command which is fed back, in a preset wait period of time, and if the valid response command is received in the wait period of time, then determining that the inserted external device is the DC-charging power source adaptor.

6. The method for charging a mobile terminal of claim 3, wherein the battery is charged directly using the charging voltage output by the DC-charging power source adaptor in one of the following three DC-charging processes:
(1) searching, by the mobile terminal, a preset reference table using the detected voltage $V_{bat\_real}$ of the battery core for a target charging voltage value $V_{out}$ corresponding to an interval in which $V_{bat\_real}$ lies, and sending the target charging voltage value $V_{out}$ to the DC-charging power source adaptor to determine the value of the charging voltage output by the DC-charging power source adaptor;
(2) sending, by the mobile terminal, the detected voltage $V_{bat\_real}$ of the battery core to the DC-charging power source adaptor, searching through the DC-charging power source adaptor a preset reference table using the detected voltage $V_{bat\_real}$ of the battery core for a target charging voltage value $V_{out}$ corresponding to an interval in which $V_{bat\_real}$ lies, and receiving the target charging voltage adjusted and output by the DC-charging power source adaptor; and
(3) determining, by the mobile terminal, a charging current maximum value $I_{max}$ from a maximum terminal voltage supported by the battery, and an inner resistance of the battery, further determining a target charging current value $I_{targ}$ corresponding to the current voltage $V_{bat\_real}$ of the battery core from $I_{max}$, and further calculating a target charging voltage value $V_{out}$ from $I_{targ}$ as well as a resistance value on a charging line, a resistance valve on a circuit board of the mobile terminal, and an inner resistance of the battery, and sending the target charging voltage value $V_{out}$ to the DC-charging power source adaptor to determine the value of the charging voltage output by the DC-charging power source adaptor.

7. The method for charging a mobile terminal of claim 3, wherein the range [S1, S2] delimited by the DC-charging thresholds agrees with a voltage range of the battery core corresponding to a constant-current charging phase in a normal DCP charging mode; and if the voltage of the battery core is less than S1, the battery is pre-charged by a power source managing chip at small current, and if the voltage of the battery core is more than S2, the battery is charged by the power source managing chip at constant voltage; and
if the voltage of the battery core goes out of the range delimited by the DC-charging thresholds, then the mobile terminal instructs the DC-charging power source adaptor to output constant charging voltage output by the DC-charging power source adaptor by default.

8. The method for charging a mobile terminal of claim 4, wherein the range [S1, S2] delimited by the DC-charging thresholds agrees with a voltage range of the battery core corresponding to a constant-current charging phase in a normal DCP charging mode; and if the voltage of the battery core is less than S1, the battery is pre-charged by a power source managing chip at small current, and if the voltage of the battery core is more than S2, the battery is charged by the power source managing chip at constant voltage; and
if the voltage of the battery core goes out of the range delimited by the DC-charging thresholds, then the mobile terminal instructs the DC-charging power source adaptor to output constant charging voltage output by the DC-charging power source adaptor by default.

9. The method for charging a mobile terminal of claim 5, wherein the range [S1, S2] delimited by the DC-charging thresholds agrees with a voltage range of the battery core corresponding to a constant-current charging phase in a normal DCP charging mode; and if the voltage of the battery core is less than S1, the battery is pre-charged by a power source managing chip at small current, and if the voltage of the battery core is more than S2, the battery is charged by the power source managing chip at constant voltage; and
if the voltage of the battery core goes out of the range delimited by the DC-charging thresholds, then the mobile terminal instructs the DC-charging power source adaptor to output constant charging voltage output by the DC-charging power source adaptor by default.

10. The method for charging a mobile terminal of claim 6, wherein the range [S1, S2] delimited by the DC-charging thresholds agrees with a voltage range of the battery core corresponding to a constant-current charging phase in a normal DCP charging mode; and if the voltage of the battery core is less than S1, the battery is pre-charged by a power source managing chip at small current, and if the voltage of the battery core is more than S2, the battery is charged by the power source managing chip at constant voltage; and
if the voltage of the battery core goes out of the range delimited by the DC-charging thresholds, then the mobile terminal instructs the DC-charging power source adaptor to output constant charging voltage output by the DC-charging power source adaptor by default.

11. The method for charging a mobile terminal of claim 3, wherein the mobile terminal determines that the inserted external device is a host, and starts a normal SDP charging mode, upon detecting that the two differential data pins of the USB interface of the mobile terminal are not shorted; and
the mobile terminal determines that the inserted external device is a normal power source adaptor, and starts a normal DCP charging mode, upon detecting that the two differential data pins of the USB interface of the mobile terminal are shorted and the mobile terminal fails to communicate the inserted external device.

12. The method for charging a mobile terminal of claim 4, wherein the mobile terminal determines that the inserted external device is a host, and starts a normal SDP charging mode, upon detecting that the two differential data pins of the USB interface of the mobile terminal are not shorted; and
the mobile terminal determines that the inserted external device is a normal power source adaptor, and starts a normal DCP charging mode, upon detecting that the two differential data pins of the USB interface of the mobile terminal are shorted and the mobile terminal fails to communicate the inserted external device.

13. The method for charging a mobile terminal of claim 5, wherein the mobile terminal determines that the inserted external device is a host, and starts a normal SDP charging mode, upon detecting that the two differential data pins of the USB interface of the mobile terminal are not shorted; and
the mobile terminal determines that the inserted external device is a normal power source adaptor, and starts a normal DCP charging mode, upon detecting that the two differential data pins of the USB interface of the mobile terminal are shorted and the mobile terminal fails to communicate the inserted external device.

14. The method for charging a mobile terminal of claim 6, wherein the mobile terminal determines that the inserted external device is a host, and starts a normal SDP charging mode, upon detecting that the two differential data pins of the USB interface of the mobile terminal are not shorted; and the mobile terminal determines that the inserted external device is a normal power source adaptor, and starts a normal DCP charging mode, upon detecting that the two differential data pins of the USB interface of the mobile terminal are shorted and the mobile terminal fails to communicate the inserted external device.

15. A method for charging by a DC-charging power source adaptor, the method comprising:
configuring two communication pins in a charging interface of the DC-charging power source adaptor to be shorted by default;
controlling the two communication pins of the charging interface to be disconnected, after the charging interface is connected with the mobile terminal; and
communicating with the mobile terminal through the communication pins, and after the communication succeeds, determining a value of charging voltage output by the DC-charging power source adaptor from current voltage of a battery core of the mobile terminal.

16. The method for charging by a DC-charging power source adaptor of claim 15, wherein the DC-charging power source adaptor waits for reception of a specific pulse waveform sent by the mobile terminal, after being connected with the mobile terminal, and controls the two communication pins of the charging interface to be disconnected, and communicates with the mobile terminal, upon reception of the specific pulse waveform.

17. The method for charging by a DC-charging power source adaptor of claim 15, wherein the DC-charging power source adaptor determines from a magnitude of charging current output by the DC-charging power source adaptor whether the DC-charging power source adaptor is connected with the mobile terminal, and controls the two communication pins of the charging interface to be disconnected, upon detecting that the DC-charging power source adaptor is connected with the mobile terminal; and then sends a communication command on its own initiative to the mobile terminal, and exchanges a handshake instruction therewith; or waits for reception of a communication command sent by the mobile terminal, and feeds back a response command upon reception of the communication command to thereby finish the handshake.

18. The method for charging by a DC-charging power source adaptor of claim 15, wherein the DC-charging power source adaptor adjusts the charging voltage output by the DC-charging power source adaptor to a target charging voltage value $V_{out}$ sent by the mobile terminal according to the target charging voltage value $V_{out}$; or
the DC-charging power source adaptor searches a reference table preset in the DC-charging power source adaptor using the voltage of the battery core sent by the mobile terminal for a target charging voltage value $V_{out}$ corresponding to the current voltage of the battery core, feeds the target charging voltage value $V_{out}$ to the mobile terminal, and adjusts the charging voltage output by the DC-charging power source adaptor to the target charging voltage value $V_{out}$.

19. The method for charging by a DC-charging power source adaptor of claim 18, wherein the DC-charging power source adaptor receives a target charging current value $I_{targ}$, and a charging current maximum value $I_{max}$, sent by the mobile terminal, or searches the reference table for a target charging current value $I_{targ}$, and a charging current maximum value $I_{max}$, corresponding to the current voltage of the battery core; and
the DC-charging power source adaptor detects in real time charging current $I_{chg}$ output by the DC-charging power source adaptor, and if $I_{targ}-I_e \le I_{chg} < I_{targ}$, then the DC-charging power source adaptor adjusts up progressively the charging voltage output by the DC-charging power source adaptor by an amount of AV, so that the real charging current $I_{chg}$ output by the DC-charging power source adaptor approaches the target charging current value $I_{targ}$; or if the absolute value of the difference between $I_{chg}$ and $I_{targ}$ is more than $I_e$ or $I_{chg}$ is more than $I_{max}$, then the DC-charging power source adaptor stops the charging voltage from being output;
wherein $I_e$ represents a controllable range of the difference between the real charging current value of the DC-charging power source adaptor and the target charging current value.

20. The method for charging by a DC-charging power source adaptor of claim 15, wherein the DC-charging power source adaptor outputs constant charging voltage by default.

* * * * *